United States Patent
Lai et al.

(10) Patent No.: US 12,501,045 B2
(45) Date of Patent: Dec. 16, 2025

(54) METHOD AND APPARATUS OF SIGNALING ADAPTIVE MOTION VECTOR DIFFERENCE RESOLUTION IN VIDEO CODING

(71) Applicant: HFI Innovation Inc., Zhubei (TW)

(72) Inventors: Chen-Yen Lai, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 102 days.

(21) Appl. No.: 17/773,909

(22) PCT Filed: Nov. 10, 2020

(86) PCT No.: PCT/CN2020/127825
§ 371 (c)(1),
(2) Date: May 3, 2022

(87) PCT Pub. No.: WO2021/093730
PCT Pub. Date: May 20, 2021

(65) Prior Publication Data
US 2022/0385910 A1   Dec. 1, 2022

Related U.S. Application Data

(60) Provisional application No. 62/933,578, filed on Nov. 11, 2019.

(51) Int. Cl.
*H04N 19/13* (2014.01)
*H04N 19/105* (2014.01)
(Continued)

(52) U.S. Cl.
CPC ........... *H04N 19/13* (2014.11); *H04N 19/105* (2014.11); *H04N 19/176* (2014.11); *H04N 19/70* (2014.11)

(58) Field of Classification Search
CPC .... H04N 19/105; H04N 19/13; H04N 19/176; H04N 19/523; H04N 19/70; H04N 19/91;
(Continued)

(56) References Cited

U.S. PATENT DOCUMENTS

| 9,918,105 B2 | 3/2018 | Pang et al. |
| 10,638,152 B2 | 4/2020 | Chuang et al. |

(Continued)

FOREIGN PATENT DOCUMENTS

| CN | 106797476 A | 5/2017 |
| CN | 107979756 A | 5/2018 |

(Continued)

OTHER PUBLICATIONS

International Search Report and Written Opinion dated Jan. 29, 2021, issued in application No. PCT/CN2020/127825.

(Continued)

*Primary Examiner* — James M Pontius
(74) *Attorney, Agent, or Firm* — McClure, Qualey & Rodack, LLP

(57) ABSTRACT

Methods and apparatus for video coding are disclosed. According to this method, a bitstream corresponding to encoded data of the video sequence is generated at an encoder side or received at a decoder side, where the bitstream comprises a first syntax related to AMVR precision, and wherein the syntax related to the AMVR precision is coded by context coding bins with at least two contexts. One or motion vectors for the target block are encoded, at the encoder side, or decoded, at the decoder side, utilizing information comprising the AMVR precision.

11 Claims, 4 Drawing Sheets

(51) Int. Cl.
*H04N 19/176* (2014.01)
*H04N 19/70* (2014.01)

(58) Field of Classification Search
CPC ... H04N 19/107; H04N 19/157; H04N 19/184
See application file for complete search history.

(56) References Cited

U.S. PATENT DOCUMENTS

| | | | |
|---|---|---|---|
| 11,089,323 B2 | 8/2021 | Chuang | |
| 11,190,789 B2* | 11/2021 | Li | H04N 19/513 |
| 11,743,452 B2* | 8/2023 | Lee | H04N 19/159 |
| | | | 375/240.02 |
| 2018/0077417 A1 | 3/2018 | Huang | |
| 2018/0359483 A1 | 12/2018 | Chen et al. | |
| 2020/0128239 A1* | 4/2020 | Henry | H04N 19/176 |
| 2020/0213612 A1* | 7/2020 | Liu | H04N 19/184 |

FOREIGN PATENT DOCUMENTS

| | | |
|---|---|---|
| CN | 108781284 A | 11/2018 |
| CN | 109076210 A | 12/2018 |
| CN | 109076214 A | 12/2018 |
| IN | 107979756 A | 5/2018 |
| TW | 201701671 A | 1/2017 |
| WO | 2019/192491 A1 | 10/2019 |

OTHER PUBLICATIONS

Huang, H., et al.; "Non-CE4: On the affine AMVR;" Joint Video Experts Team (JVET) of ITU-T SG 16 WP 3 and ISO/IEC JTC 1/SC 29/WG 11; Oct. 2019; pp. 1-4.
Chinese language office action dated Dec. 10, 2021, issued in application No. TW 109139309.
Extended European Search Report dated Nov. 3, 2023, issued in application No. EP 20887356.2.
Li, G., et al.; "Non-CE4: Unified AMVR signaling;" Joint Video Experts Team (JVET) of ITU-T SG 16 WO 3 and ISO/IEC JTC 1/SC 29/WG 11; Sep. 2019; pp. 1-5.
Chinese language office action dated Oct. 22, 2024, issued in application No. CN 202080077711.1.
Korea language office action dated Jan. 11, 2025, issued in application No. KR 10-2022-7018505.
English language translation of office action issued in KR 10-2022-7018505 (pp. 1-4 of attachment).
Bross, B., et al.; "Versatile Video Coding (Draft 7);" Joint Video Experts Team (JVET) of ITU-T SG 16 WP 3 and ISO/IEC JTC 1/SC 29/WG 11; Oct. 2019; pp. 1-486.
CABACREADER.CPP; "VVCSoftware_VTM-VTM-6.3;" Oct. 2019; pp. 1-60.

* cited by examiner

METHOD AND APPARATUS OF SIGNALING ADAPTIVE MOTION VECTOR DIFFERENCE RESOLUTION IN VIDEO CODING

CROSS REFERENCE TO RELATED APPLICATIONS

The present invention claims priority to U.S. Provisional Patent Application, Ser. No. 62/933,578, filed on Nov. 11, 2019. The U.S. Provisional Patent Application is hereby incorporated by reference in its entirety.

FIELD OF THE INVENTION

The present invention relates to video coding. In particular, the present invention discloses techniques of signaling Adaptive Motion Vector Difference Resolution (AMVR) information for video coding.

BACKGROUND AND RELATED ART

Adaptive Intra/Inter video coding has been widely used in various video coding standards, such as MPEG-2, AVC (advanced video coding) and HEVC (High Efficiency Video Coding). In adaptive Intra/Inter video coding, an input signal is predicted by Intra/Inter predictor to generate prediction residues. The residues are often processed by a two-dimensional transform and quantized. The quantized transform coefficients are then coded. The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A CTU can be further partitioned into multiple Coding Units (CUs) through Quad-Tree or Quadtree (QT) partitioning. The QT partition splits a block of size 4N×4N into 4 equal-size 2N×2N sub-blocks. The CTU can be a single CU (i.e., no splitting) or can be split into four smaller units of equal size, which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

According to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC.

After obtaining the residual block by the prediction process based on PU splitting type, the prediction residues of a CU can be partitioned into transform units (TU) according to another quadtree structure which is analogous to the coding tree for the CU. The TU is a basic representative block having residual or transform coefficients for applying the integer transform and quantization. For each TU, one integer transform having the same size as the TU is applied to obtain residual coefficients. These coefficients are transmitted to the decoder after quantization on a TU basis.

FIG. 1 illustrates an exemplary adaptive Inter/Intra video coding system incorporating transform and quantization to process prediction residues. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, Loop filter 130 is often applied to the reconstructed video data before the reconstructed video data are stored in the Reference Picture Buffer 134 in order to improve video quality. For example, de-blocking filter (DF) and Sample Adaptive Offset (SAO) have been used in the High Efficiency Video Coding (HEVC) standard. The loop filter may also include ALF (Adaptive Loop Filter). The loop filter information may have to be incorporated in the bitstream so that a decoder can properly recover the required information. Therefore, loop filter information is provided to Entropy Encoder 122 for incorporation into the bitstream. In FIG. 1, Loop filter 130 is applied to the reconstructed video before the reconstructed samples are stored in the reference picture buffer 134. The system in FIG. 1 is intended to illustrate an exemplary structure of a typical video encoder. It may correspond to the High Efficiency Video Coding (HEVC) system or H.264.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

Advanced Motion Vector Prediction Mode (AMVP)

In most coding standards, adaptive Inter/Intra prediction is used on a block basis. In the Inter prediction mode, one or two motion vectors are determined for each block to select one reference block (i.e., uni-prediction) or two reference blocks (i.e., bi-prediction). The motion vector or motion vectors are determined and coded for each individual block. In HEVC, Inter motion compensation is supported in two different ways: explicit signaling or implicit signaling. In explicit signaling, the motion vector for a block (i.e., PU) is signaled using a predictive coding method. The motion vector predictors correspond to motion vectors associated with spatial and temporal neighbors of the current block. The best MVP with the smallest motion vector difference (MVD) compared to the corresponding MV can be chosen for efficiently coding. Since the encoder and the decoder maintain a same set of MVPs, an MVP index is signaled the best MVP. After a MV predictor is determined, the motion vector difference (MVD) is coded and transmitted. This mode is also referred as AMVP (advanced motion vector prediction) mode. In implicit signaling, one predictor from a candidate predictor set is selected as the motion vector for the current block (i.e., PU). Since both the encoder and decoder will derive the candidate set and select the final motion vector in the same way, there is no need to signal the MV or MVD in the implicit mode. This mode is also referred as Merge mode. The forming of predictor set in Merge mode is also referred as Merge candidate list construction. An index, called Merge index, is signaled to indicate the predictor selected as the MV for current block.

Affine Model

Motion occurs across pictures along temporal axis can be described by a number of different models. Assuming A(x, y) be the original pixel at location (x, y) under consideration, A'(x', y) be the corresponding pixel at location (x y) in a reference picture for a current pixel A(x, y), the affine motion models are described as follows:

While the conventional motion estimation can only describe translational motion, the affine model is capable of describing two-dimensional block rotations as well as two-dimensional deformations to transform a square (or rectangles) into a parallelogram. This model can be described as follows:

$$x'=a_0+a_1*x+a_2*y, \text{ and}$$

$$y'=b_0+b_1*x+b_2*y. \quad (1)$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax+by+e \\ y' = -bx+ay+f \\ vx = x-x' \\ vy = y-y' \end{cases} \overset{\Delta}{\Longrightarrow} \begin{cases} vx = (1-a)x-by-e \\ vy = (1-a)y+bx-f \end{cases} \quad (2)$$

An example of the four-parameter affine model is shown in FIG. 3A, where block 310 corresponds to the current block. The transformed block is a rectangular block. The four-parameter affine model can handle object rotation as shown in FIG. 3B, where the rectangle 310 is rotated to rectangle 320. The location of the rotated rectangle 320 can be specified by the motion vectors (i.e., $\vec{v}_0$ and $\vec{v}_1$) at two control points. The four-parameter affine model can also handle object rotation with size scaling.

The motion vector field of each point in this moving block can be described by the following equation:

$$\begin{cases} v_x = \frac{(v_{1x}-v_{0x})}{w}x - \frac{(v_{1y}-v_{0y})}{w}y+v_{0x} \\ v_y = \frac{(v_{1y}-v_{0y})}{w}x + \frac{(v_{1x}-v_{0x})}{w}y+v_{0y} \end{cases} \quad (3)$$

In the above equations, ($v_{0x}$, $v_{0y}$) is the control point motion vector (i.e., $v_0$) at the upper-left corner of the block, and ($v_{1x}$, $v_{1y}$) is another control point motion vector (i.e., $v_1$) at the upper-right corner of the block.

Beside the four-parameter affine model, a six-parameter affine model has also been adopted in advanced video coding standard such as HEVC.

Intra Block Copy (IBC)/Current Picture Referencing

For certain video contents, the spatial correlation among pixels within the same picture is different for screen content. For typical video with text and graphics, there are usually repetitive patterns within the same picture. Hence, Intra (picture) block compensation has been observed to be very effective. A new prediction mode, i.e., the Intra block copy (IBC) mode or called current picture referencing (CPR), has been introduced for screen content coding to utilize this characteristic. In the CPR mode, a prediction unit (PU) is predicted from a previously reconstructed block within the same picture. Further, a displacement vector (called block vector or BV) is used to signal the relative displacement from the position of the current block to the position of the reference block. The prediction errors are then coded using transformation, quantization and entropy coding.

Intra block copy (IBC) is adopted in HEVC extensions on SCC and the emerging video coding standard, Versatile Video Coding (VVC). It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector is rounded to integer precision as well. When combined with AMVR, the IBC mode can switch between 1-pel and 4-pel motion vector precisions. An IBC-coded CU is treated as the third prediction mode other than Intra or Inter prediction modes. The IBC mode is applicable to the CUs with both width and height smaller than or equal to 64 luma samples.

Advanced Motion Vector Resolution (AMVR)

Adaptive motion vector difference resolutions (AMVR) supports three kinds of motion vector resolutions, including quarter-luma samples, integer-luma samples, and four-luma samples, to reduce the side information of motion vector differences (MVDs). Flags signaled in SPS-level and CU-level are used to indicate whether AMVR is enabled or not and which motion vector resolution is selected for current CU. On advanced motion vector prediction mode (AMVP), motion vectors (MVs) are generated by uni- or bi-prediction, and then one or a set of motion vector predictors (MVPs) will be generated at the same time. The best MVP with the smallest motion vector difference (MVD) compared to the corresponding MV can be chosen for efficiently coding. With AMVR enabling, MVs and MVPs are both adjusted according to the selected motion vector resolution, and MVDs will be aligned to the resolution at the same time.

In HEVC, AMVP mode uses one MVP index for selecting the motion vector predictor among those in the MVP candidate list. If AMVR is enabled, both AMVR flag and MVP index need to be signaled.

In VVC Draft 7 standard, JVET-P2001 (B. Bross, et al., "Versatile Video Coding (Draft 7)", Joint Video Experts Team (WET) of ITU-T SG 16 WP 3 and ISO/IEC JTC 1/SC 29/WG 11, 16th Meeting: Geneva, CH, 1-11 Oct. 2019, Document: JVET-P2001-vB), some AMVR parameters are signal in the CU level as shown in Table 1.

TABLE 1

Some AMVR parameters signaled in the CU level according to VVC Draft 7

```
if( ( sps_amvr_enabled_flag && inter_affine_flag[ x0 ][ y0 ] = = 0 &&
      ( MvdL0[ x0 ][ y0 ][ 0 ] != 0 | | MvdL0[ x0 ][ y0 ][ 1 ] != 0 | |
    MvdL1[ x0 ][ y0 ][ 0 ] != 0 | | MvdL1[ x0 ][ y0 ][ 1 ] != 0 ) ) | |
    ( sps_affine_amvr_enabled_flag && inter_affine_flag[ x0 ][ y0 ] = = 1
                                 &&
( MvdCpL0[ x0 ][ y0 ][ 0 ][ 0 ] != 0 | | MvdCpL0[ x0 ][ y0 ][ 0 ][ 1 ] !=
                                0 | |
MvdCpL1[ x0 ][ y0 ][ 0 ][ 0 ] != 0 | | MvdCpL1[ x0 ][ y0 ][ 0 ][ 1 ] != 0
                                | |
MvdCpL0[ x0 ][ y0 ][ 1 ][ 0 ] != 0 | | MvdCpL0[ x0 ][ y0 ][ 1 ][ 1 ] != 0
                                | |
MvdCpL1[ x0 ][ y0 ][ 1 ][ 0 ] != 0 | | MvdCpL1[ x0 ][ y0 ][ 1 ][ 1 ] != 0
                                | |
MvdCpL0[ x0 ][ y0 ][ 2 ][ 0 ] != 0 | | MvdCpL0[ x0 ][ y0 ][ 2 ][ 1 ] != 0
                                | |
  MvdCpL1[ x0 ][ y0 ][ 2 ][ 0 ] != 0 | | MvdCpL1[ x0 ][ y0 ][ 2 ][ 1 ] !=
                             0 ) ) {
            amvr_flag[ x0 ][ y0 ]                              ae(v)
        if( amvr_flag[ x0 ][ y0 ] )
          amvr_precision_idx[ x0 ][ y0 ]                       ae(v)
                                 }
``` amvr_flag[x0][y0] specifies the resolution of motion vector difference. The array indices x0, y0 specify the location (x0, y0) of the top-left luma sample of the considered coding block relative to the top-left luma sample of the picture. amvr_flag[x0][y0] equal to 0 specifies that the resolution of the motion vector difference is ¼ of a luma sample. amvr_flag[x0][y0] equal to 1 specifies that the resolution of the motion vector difference is further specified by amvr_precision_idx[x0][y0].

When amvr_flag[x0][y0] is not present, it is inferred as follows:

If CuPredMode[chType][x0][y0] is equal to MODE_IBC, amvr_flag[x0][y0] is inferred to be equal to 1.

Otherwise (CuPredMode[chType][x0][y0] is not equal to MODE_IBC), amvr_flag[x0][y0] is inferred to be equal to 0.

amvr_precision_idx[x0][y0] specifies that the resolution of the motion vector difference with AmvrShift is defined in Table 16 of VVC Draft 7. The array indices x0, y0 specify the location (x0, y0) of the top-left luma sample of the considered coding block relative to the top-left luma sample of the picture.

When amvr_precision_idx[x0][y0] is not present, it is inferred to be equal to 0.

The assignment of ctxInc to syntax elements with context coded bins for amvr_flag[x0][y0] and amvr_precision_idx[ ][ ] are shown in Table 2.

TABLE 2

Assignment of ctxInc to syntax elements with context coded bins

| Syntax element | 0 | 1 | 2 | 3 | 4 | >=5 |
|---|---|---|---|---|---|---|
| amvr_flag[ ][ ] | inter_affine_flag[ ][ ] ? 1 : 0 | na | na | na | na | na |
| amvr_precision_idx [ ][ ] | 0 | 1 | na | na | na | na |

BRIEF SUMMARY OF THE INVENTION

A method and apparatus for coding a video sequence, wherein an Adaptive Motion Vector Difference Resolution (AMVR) mode is supported, are disclosed. According to the present invention, a bitstream corresponding to encoded data of the video sequence is generated at an encoder side or received at a decoder side, where the bitstream comprises a syntax related to AMVR precision, and wherein the syntax related to the AMVR precision is coded by context coding bins with at least two contexts. One or more motion vectors for the target block are encoded, at the encoder side, or decoded, at the decoder side, utilizing information comprising the AMVR precision.

1003311n one embodiment, the syntax related to the AMVR precision is coded in a Coding Unit (CU) level.

In one embodiment, said at least two contexts comprise a first context corresponding to Intra Block Copy (IBC) mode and a second context corresponding to non-IBC mode.

In another embodiment, said at least two contexts comprise a first context corresponding to affine mode and a second context corresponding to non-affine mode.

DETAILED DESCRIPTION OF THE INVENTION

Figure 1:
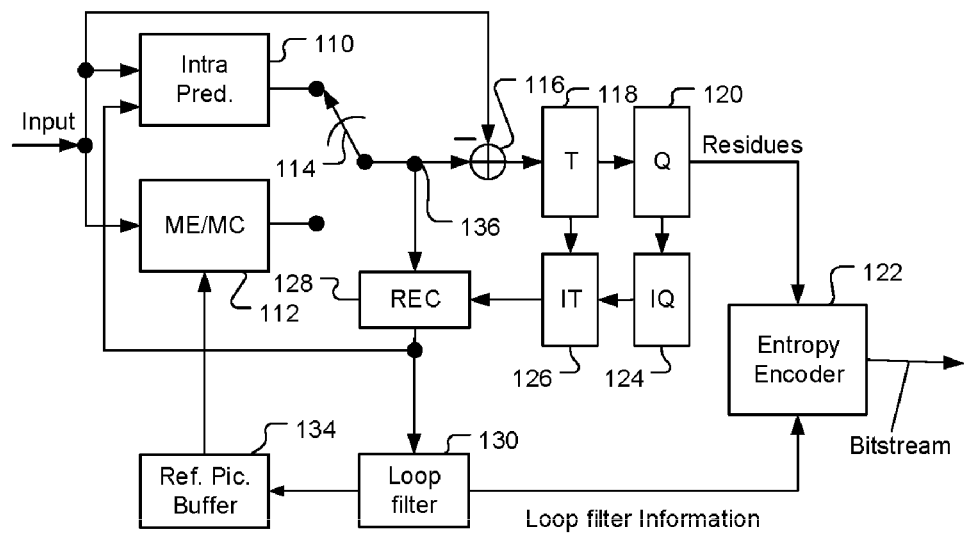
FIG. 1 illustrates an exemplary block diagram of a video encoder, where the video encoder incorporates Intra/Inter prediction, transform and quantization processes.
Figure 2:
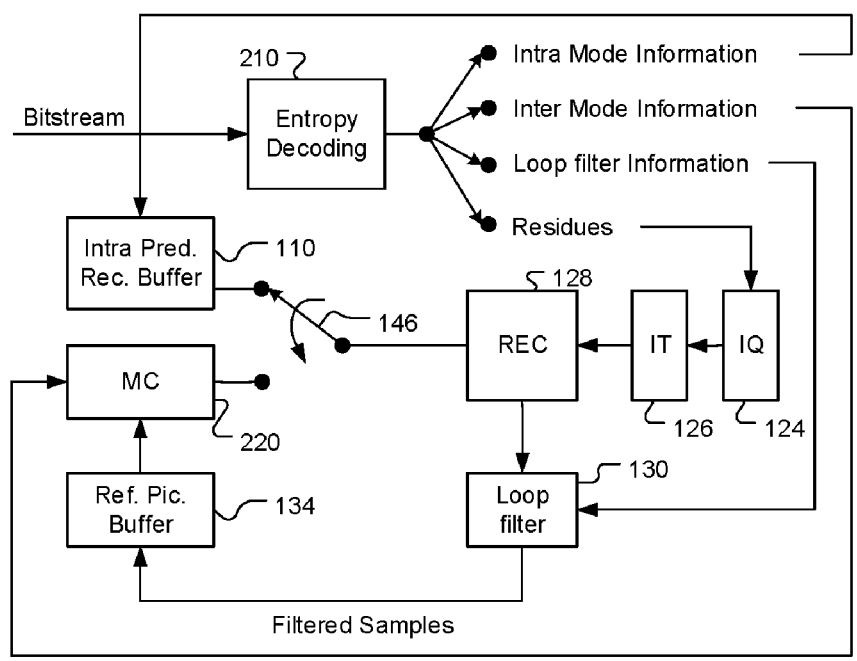
FIG. 2 illustrates an exemplary block diagram of a video decoder, where the video decoder incorporates Intra/Inter prediction, inverse transform and de-quantization processes.
Figure 3A:
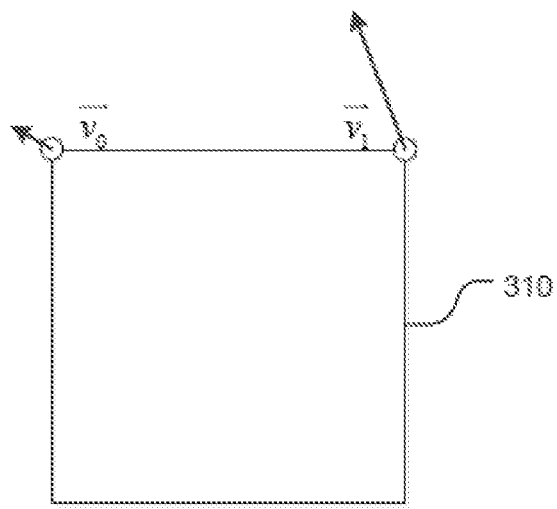
FIG. 3A illustrates an example of four-parameter affine model.
Figure 3B:
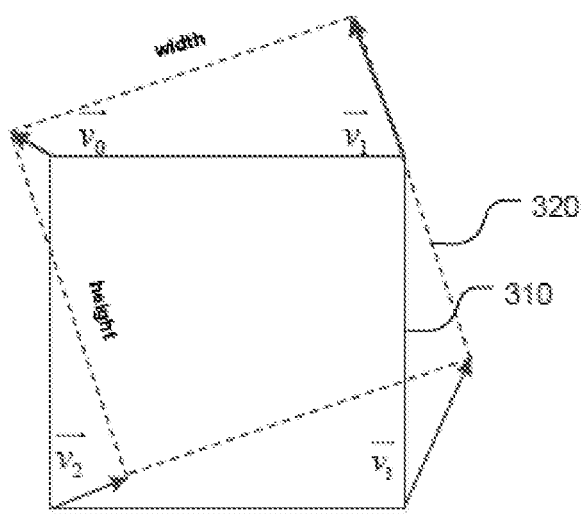
FIG. 3B illustrates an example of the four-parameter affine model which can handle object rotation.

The following description is of the best-contemplated mode of carrying out the invention. This description is made for the purpose of illustrating the general principles of the invention and should not be taken in a limiting sense. The scope of the invention is best determined by reference to the appended claims.

Syntaxes amvr_flag and amvr_precision_idx are used to indicate different resolutions for decoded MVDs. When amvr_flag is equal to 0, quarter-pel luma sample is used to decode MVDs. Furthermore, if amvr_flag is equal to 1, amvr_precision_idx will be signaled to indicate which integer-pel luma sample resolution will be applied. The adaptive motion vector resolution (AMVR) can also be applied to Inter mode (non-affine), affine mode, and IBC mode. In affine mode, three MV resolutions are supported, including quarter-pel, 1/16-pel, and integer-pel, which is coded with codewords {0, 10, 11} according to one embodiment of the present invention. The first bin is regarding to amvr_flag and the second bin is regarding of amvr_precision_idx. In IBC mode, only two MV resolutions are supported, including integer-pel, and 4-pel resolution, which is coded with codewords {10, 11} according to one embodiment of the present invention. The first bin is regarding to amvr_flag and it will always be inferred to 1 when coded with IBC mode and the second bin is regarding to amvr_precision_idx for indicating whether 4-pel is used or not. In non-affine Inter mode, 4 MV resolutions are supported, including quarter-pel, half-pel, integer-pel, and 4-pel, which is coded with codewords {0, 10, 110, 111} according to one embodiment of the present invention. The first bin is regarding to amvr_flag and the other two bins are regarding to amvr_precision_idx.

The context variables design in the above three modes can be further aligned according to embodiments of the present invention. For example, the usage of second bins described above can be always used to distinguish fractional and integer MV resolution. In one embodiment, amvr_precision_idx can be split into two syntax elements, such as amvr_precision_int and amvr_precision_rest. In this way, in IBC mode, 2 MV resolutions supported by IBC can be coded by codewords {110, 111}. The first bins are regarding to amvr_flag and it will be inferred to 1. The second bins are regarding to amvr_precision_int, and it also be inferred to 1 in IBC mode. Only the third bins regarding to amvr_precision_rest are needed to be signaled. In affine mode, 3 MV resolutions are supported and coded with codewords {0, 10, 11}. Only amvr_flag and amvr_precision_int need to be signaled. No amvr_precision_rest is needed for the affine mode. In the non-affine Inter mode, 4 MV resolutions are supported, including quarter-pel, half-pel, integer-pel and 4-pel, and coded with codewords {0, 10, 110, 111}. The first bins used to indicate quarter-pel resolution are regarding to amvr_flag. The second bins used to indicate fractional resolution are regarding to amvr_precision_int. The third bins used to indicate 1-pel resolution are regarding to amvr_precision_rest.

In another embodiment, a syntax, such as amvr_precision_flag, can be coded by context coding bins with more than one context variable. For example, one variable for affine mode and the other variable for non-affine mode can be used according to embodiments of the present invention.

In another example, one variable for IBC mode, and the other variable for non-IBC mode.

Any of the foregoing proposed methods can be implemented in encoders and/or decoders. For example, any of the proposed methods can be implemented in a module responsible for coding AMVR precision information at an encoder or a decoder. Alternatively, any of the proposed methods can be implemented as a circuit coupled to the module responsible for coding AMVR precision information at an encoder or a decoder.

Figure 4:
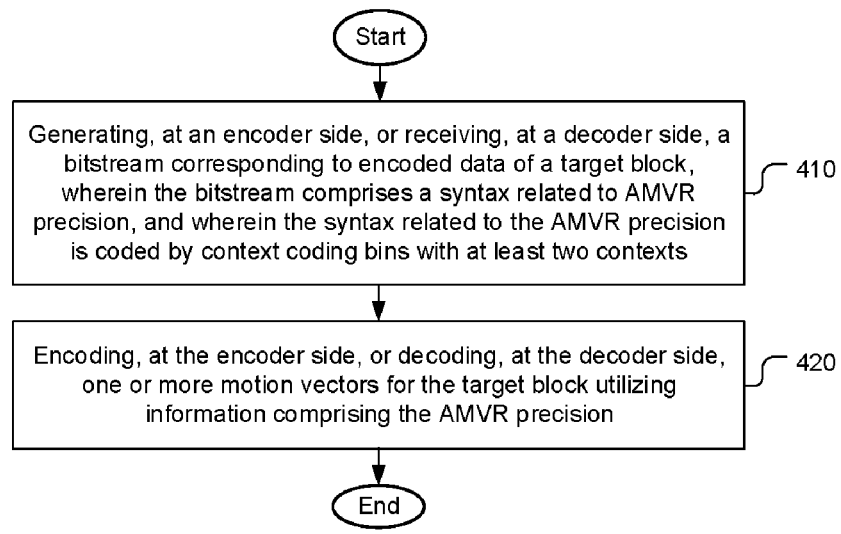
FIG. 4 illustrates a flowchart of an exemplary coding system that codes a syntax related to Adaptive Motion Vector Difference Resolution (AMVR) information using context coding bins with at least two contexts according to an embodiment of the present invention.

FIG. 4 illustrates a flowchart of an exemplary coding system that codes a syntax related to AMVR ( ) information using context coding bins with at least two contexts according to an embodiment of the present invention. The steps shown in the flowchart may be implemented as program codes executable on one or more processors (e.g., one or more CPUs) at the encoder side.

The steps shown in the flowchart may also be implemented based hardware such as one or more electronic devices or processors arranged to perform the steps in the flowchart. According to this method, a bitstream corresponding to encoded data of the video sequence is generated at an encoder side or received at a decoder side in step 410, wherein the bitstream comprises a syntax related to AMVR precision, and wherein the syntax related to the AMVR precision is coded by context coding bins with at least two contexts. One or motion vectors for the target block are encoded, at the encoder side, or decoded, at the decoder side, utilizing information comprising the AMVR precision in step 420.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for coding a video sequence, wherein an Adaptive Motion Vector Difference Resolution (AMVR) mode is supported, the method comprising:
  generating, at an encoder side, or receiving, at a decoder side, a bitstream corresponding to encoded data of a target block, wherein the bitstream comprises a syntax related to AMVR precision, and wherein the syntax related to the AMVR precision is coded by context coding bins with at least two contexts, wherein said at least two contexts comprise a first context corresponding to Intra Block Copy (IBC) mode and a second context corresponding to non-IBC mode; and
  encoding, at the encoder side, or decoding, at the decoder side, one or more motion vectors for the target block utilizing information comprising the AMVR precision.

2. The method of claim 1, wherein the syntax related to the AMVR precision is coded in a Coding Unit (CU) level.

3. The method of claim 1, wherein said at least two contexts comprise a first context corresponding to affine mode and a second context corresponding to non-affine mode.

4. The method of claim 1, wherein the syntax related to the AMVR precision corresponding to IBC mode is the same as the syntax related to the AMVR precision corresponding to non-IBC mode.

5. The method of claim 1, wherein the syntax related to the AMVR precision corresponds to more than one syntax element.

6. The method of claim 1, wherein the syntax related to the AMVR precision corresponds to a single syntax element coded by at least two contexts comprising the first context corresponding to IBC mode and the second context corresponding to non-IBC mode.

7. An apparatus for coding a video sequence, wherein an Adaptive Motion Vector Difference Resolution (AMVR) mode is supported, the apparatus comprising one or more electronic circuits or processors arranged to:
  generate, at an encoder side, or receive, at a decoder side, a bitstream corresponding to encoded data of a target block, wherein the bitstream comprises a syntax related to AMVR precision, and wherein the syntax related to the AMVR precision is coded by context coding bins with at least two contexts, wherein said at least two contexts comprise a first context corresponding to Intra Block Copy (IBC) mode and a second context corresponding to non-IBC mode; and
  encoding, at the encoder side, or decoding, at the decoder side, one or more motion vectors for the target block utilizing information comprising the AMVR precision.

8. The apparatus of claim 7, wherein the syntax related to the AMVR precision is coded in a Coding Unit (CU) level.

9. The apparatus of claim 7, wherein said at least two contexts comprise a first context corresponding to affine mode and a second context corresponding to non-affine mode.

10. The apparatus of claim 7, wherein the syntax related to the AMVR precision corresponds to more than one syntax element.

11. The apparatus of claim 7, wherein the syntax related to the AMVR precision corresponds to a single syntax element coded by at least two contexts comprising the first context corresponding to IBC mode and the second context corresponding to non-IBC mode.

* * * * *